(12) United States Patent
Brennenstuhl et al.

(10) Patent No.: US 9,030,145 B2
(45) Date of Patent: May 12, 2015

(54) DEVICE AND METHOD FOR REGULATING AN INCREASE IN THE OUTPUT TORQUE OVER TIME OF AN ELECTRIC DRIVE MOTOR

(75) Inventors: Jens Brennenstuhl, Albershausen (DE); Heiko Roehm, Stuttgart (DE); Dietmar Saur, Gomaringen (DE); Tobias Herr, Stuttgart (DE); Ralf Windsheimer, Stuttgart (DE); Stefan Mock, Remshalden (DE)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 13/541,625

(22) Filed: Jul. 3, 2012

(65) Prior Publication Data
US 2013/0057190 A1    Mar. 7, 2013

(30) Foreign Application Priority Data
Jul. 5, 2011   (DE) .................. 10 2011 078 629

(51) Int. Cl.
*H02P 7/00*      (2006.01)
*H02P 7/29*      (2006.01)
*H02P 29/02*     (2006.01)
*H02P 21/00*     (2006.01)
*B25F 5/00*      (2006.01)
*H02H 7/08*      (2006.01)

(52) U.S. Cl.
CPC ................ *H02P 7/29* (2013.01); *H02P 29/028* (2013.01)

(58) Field of Classification Search
USPC ................................... 318/432–474
See application file for complete search history.

(56) References Cited

U.S. PATENT DOCUMENTS

| 2002/0030465 A1* | 3/2002 | Kato ............................. 318/727 |
| 2009/0045762 A1* | 2/2009 | Hayashi et al. ................ 318/379 |
| 2009/0065225 A1* | 3/2009 | Forster et al. ..................... 173/2 |
| 2010/0307782 A1* | 12/2010 | Iwata et al. ....................... 173/1 |

* cited by examiner

*Primary Examiner* — Bentsu Ro
*Assistant Examiner* — Said Bouziane
(74) *Attorney, Agent, or Firm* — Kenyon & Kenyon LLP

(57) ABSTRACT

A device for regulating an increase in the output torque over time of an electric drive motor, including a monitoring unit for monitoring an operating variable of the electric drive motor, a regulating unit for regulating the operating variable for regulating the increase in output torque over time, a control unit for activating the regulating unit as a function of a time derivation of the monitored operating variable, the regulating unit being designed to be deactivated after a predetermined period of time. A method for regulating an increase in the output torque over time of an electric drive motor is also described. A corresponding tool and a computer program having program code for carrying out the method are also described.

10 Claims, 3 Drawing Sheets

DEVICE AND METHOD FOR REGULATING AN INCREASE IN THE OUTPUT TORQUE OVER TIME OF AN ELECTRIC DRIVE MOTOR

CROSS REFERENCE

The present application claims the benefit under 35 U.S.C. §119 of German Patent Application No. DE 102011078629.5 filed on Jul. 5, 2011, which is expressly incorporated herein by reference in its entirety.

FIELD OF THE INVENTION

The present invention relates to a device and a method for regulating an increase in the output torque over time of an electric drive motor. The present invention furthermore relates to a tool.

BACKGROUND INFORMATION

Battery-operated power tools, such as cordless screwdrivers, are conventional. During operation, they may be heavily loaded by widely fluctuating loads and load changes—when a hole saw gets stuck, for example—so that mechanical components of the power tool usually have a reduced operating life. A spontaneous increase in load torque may furthermore cause components to fail or produce spontaneous changes in the holding force for an operator or user.

To avoid this, either high-strength components or components of larger dimensions, which, however, are more expensive, bigger and/or heavier, are typically used for mechanical components in battery-operated power tools.

A battery-operated power tool is described in U.S. Published Patent Application No. 2009/0065225 A1, the power tool having an electric motor. An electric motor current is monitored, and a change over time in the motor current is measured. If this measured value exceeds a predetermined value, the drive motor is stopped.

One disadvantage of the conventional power tools is, in particular, that a corresponding stopping device which stops the drive motor remains active so that further operation of the power tool is possible only after active acknowledgement of the shutdown by a user. This means, in particular, that a user must manually deactivate or reset the stopping device.

SUMMARY

An object of the present invention is to provide a device for regulating an increase in the output torque over time of an electric drive motor, the device being able to again provide a maximum possible drive torque even after a control intervention, due to a limiting value exceeding a derivation of a monitored operating variable.

Another object of the present invention is to provide a corresponding method for regulating an increase in the output torque over time of an electric drive motor.

Another object of the present invention is to provide a corresponding tool having an electric drive motor.

Another object of the present invention is to provide a corresponding computer program.

According to one aspect of the present invention, an example device is provided for regulating an increase in the output torque over time of an electric drive motor. The example device includes a monitoring unit which monitors an operating variable, in particular an operating variable to be monitored. A regulating unit for regulating the operating variable, in particular the operating variable to be regulated, is furthermore provided for regulating the increase in output torque over time. In particular, this means that the operating variable, and thus the increase in output torque over time, is regulated with the aid of the regulating unit, the output torque being provided with the aid of the electric drive motor.

The example device furthermore includes a control unit which may activate the regulating unit as a function of a time derivation of the monitored operating variable. In addition, the regulating unit is designed to be deactivated after a predetermined period of time. In particular, this means that the regulating unit may be automatically deactivated after a predetermined period of time, or the regulating unit may be deactivated after a predetermined period of time.

According to another aspect of the present invention, an example method is provided for regulating an increase in the output torque over time of an electric drive motor. An operating variable of the drive motor is monitored hereby. The operating variable is furthermore regulated. This regulation is carried out as a function of a time derivation of the monitored operating variable. The operating variable is regulated for the purpose of regulating the increase in output torque over time. It is furthermore provided that the regulation of the operating variable is terminated after a predetermined period of time.

According to another aspect of the present invention, an example tool having an electric drive motor is provided, the tool including a device for regulating an increase in the output torque over time of the electric drive motor.

According to yet another aspect of the present invention, an example computer program having program code is provided for carrying out the method for regulating an increase in the output torque over time of an electric motor when the computer program is run on a control unit.

The present invention thus includes, in particular, the idea of monitoring an operating variable of the electric drive motor and forming a time derivation of the monitored operating variable therefrom. The time derivation may be, in particular, the first time derivation of the monitored operating variable. Such a first time derivation of the monitored operating variable may also be referred to, in particular, as a rate of change over time or as a time rate of change. The operating variable is then regulated as a function of this rate of change over time in such a way that the increase in output torque over time is regulated on the basis of the regulation. Note that an output torque provided with the aid of the drive motor correlates, in particular, with the operating variable. In particular, the output torque may thus also be regulated by regulating the operating variable, so that this makes it possible to regulate the increase in output torque over time.

For regulating the increase in output torque over time, the control unit activates the regulating unit as a function of the time derivation. Since the time derivation usually correlates strongly with the presence of a spontaneous increase in the load torque of the drive motor, such a spontaneous increase in load torque may be detected based on monitoring the operating variable as well as forming the time derivation. Since the increase in output torque over time is regulated on the basis of the regulation of the operating variable when such an increase in load torque occurs, damage to mechanical and/or electrical components is advantageously avoided.

For example, such a spontaneous increase in load torque may result from a stuck hole saw or a tilting of a cordless screwdriver, the spontaneous increase in load torque disappearing again when the hole saw is no longer stuck or the cordless screwdriver is no longer tilted. The regulation of the operating variable is then advantageously terminated after a predetermined period of time. In particular, this means that the regulating unit is automatically deactivated after the predetermined period of time without the user having to intervene manually. This makes it possible to make a full range of tool functions available to the user again. In particular, this means that no limitations which have arisen due to the activated regulating unit exist anymore after automatic deactivation of the regulating unit.

According to one specific embodiment, the operating variable may be, for example, an electric variable supplied to the electric drive. The monitored operating variable may preferably also be a motor speed of the drive motor. In particular, multiple operating variables may be monitored, i.e., in particular the motor speed and the electric variable. It should be noted that, when a monitoring of the electric variable is described in greater detail below, a monitoring of the motor speed is preferably also possible as an alternative or in addition.

According to one specific embodiment, a regulation of the increase in output torque over time includes a limiting of the increase in output torque over time. In particular, this means that the output torque which is provided with the aid of the drive motor increases more slowly over time than before the regulation. In particular, the regulating of the increase in output torque over time includes a stopping of the increase in output torque over time. In particular, this means that the output torque is regulated to a constant value. In particular, the regulating of the increase in output torque over time includes a reversal of the increase in output torque over time. In particular, this means that the output torque is reduced. In particular, it may be provided that the operating variable is reduced for the purpose of regulating the increase in output torque over time. In particular, reducing the operating variable also causes the output torque to be reduced.

According to one specific embodiment, the electric variable is an electric current and/or a voltage. The voltage may thus also be referred to, in particular, as an operating voltage. In particular, the electric current may also be referred to as an operating current. The operating current and/or the operating voltage and/or the motor speed are preferably monitored. In particular, the monitoring of multiple operating variables has the advantage that an improved regulation adapted to the situation is possible.

According to one specific embodiment, the operating variable is regulated when an absolute value of the time derivation is greater than an absolute value of a predefined limiting value. A predefined limiting value of this type may be, for example, a voltage limiting value and/or a current limiting value and/or a motor speed limiting value. In particular, this means that the regulating unit is activated when the absolute value of the time derivation is greater than the absolute value of the predefined limiting value. In particular, reference is hereby made to the absolute value, since a rate of change over time of an operating voltage during an increase in load torque is negative, due to the resulting voltage drop.

According to another specific embodiment, it may be provided that the operating variable is regulated when the absolute value of the time derivation is greater than the absolute value of the predefined limiting value multiple times in a row within the predefined period of time. In particular, therefore, this means that the regulating unit is not activated until the absolute value of the time derivation is greater than the absolute value of the predefined limiting value multiple times in a row during the predefined period of time. It may be preferably provided that a control intervention is carried out only if the absolute value of the time derivation is greater than the absolute value of the predefined limiting value more than a value of n times within the predefined period of time, n being a natural number. In particular, this avoids a control intervention during normal operation if the monitored operating variable fluctuates greatly on a harmless absolute level.

According to another specific embodiment, the regulation includes reducing the operating variable, the reduced operating variable being increased back to its value prior to the reduction over the predetermined period of time. In particular, this means that the operating variable is reduced. However, this reduction is reversed, in particular over the predetermined period of time, if the reduced operating variable is increased back to its value prior to the reduction. The control intervention is thus successfully reset or reversed. This continuously increases the reduced operating variable, in particular the reduced electric variable, until the output value at the beginning of the regulation is reached. As a result, no abrupt change from the reduced level and no uncontrolled overshooting take place, which enables the user to hold the tool more securely. Furthermore, damage to the mechanical and/or electrical components is also advantageously avoided.

Spontaneous load torque changes which result in or lead to a high absolute load torque are usually critical for components and the user. By generating and evaluating the time derivation of the monitored operating variable multiple times consecutively, a differentiation or distinction may advantageously be made, in particular, between a normal operating state and a critical operating state, so that the regulating unit is not activated in a normal operating state but only, in particular, in the critical operating state.

According to another specific embodiment, the regulating unit includes a pulse width modulator for a pulse width modulation of the operating variable, in particular the electric variable. In particular, this therefore means that the regulation of the operating variable includes a pulse width modulation of the operating variable. During the pulse width modulation, the operating variable is switched back and forth, in particular, between two values. In particular, this therefore means that the operating variable switches between these two values. A pulse width modulation may also be referred to as a pulse duration modulation. The term pulse width modulation may also be abbreviated below as PWM. By providing the pulse width modulation for the operating variable, in particular, a discontinuous operating mode is advantageously achieved, which may advantageously result, for example, in a regulation of the increase in output torque over time.

According to another specific embodiment, an electric field formed with the aid of the electric drive motor is reversed for the purpose of regulating the increase in output torque over time. In particular, this therefore means that the regulating unit includes a reversing unit for reversing an electric field formed with the aid of the drive motor. This specific embodiment is advantageously suitable, in particular, for EC electric motors. In this case, the abbreviation EC stands for "electronically commutated." An EC motor of this type may also be referred to as a brushless DC motor. For example, the increase in output torque over time is advantageously regulated by reversing the electric field. Furthermore, a regulation of the increase in output torque over time based on the regulation of the operating variable may advantageously be carried out much faster due to the reversal of the electric field.

The electric drive motor is designed as an electric motor according to another specific embodiment.

According to another specific embodiment, a battery is provided which may supply the electric drive motor with electrical power, in particular an electric current and/or a voltage. A battery of this type may be situated in the tool, in particular, detachably or replaceably. It may also be provided, in particular, that the battery is fixedly installed in the tool. A battery may also be referred to as an accumulator. When multiple batteries are interconnected, this configuration or interconnection may also be referred to as a battery pack.

According to yet another specific embodiment, the tool may be designed as a cordless screwdriver, a cordless combi drill, a cordless circular saw, a cordless jigsaw, a cordless planer, a cordless hammer drill, a cordless percussion drill or as a cordless impact combi drill.

According to another specific embodiment, the predetermined period of time for deactivating the regulation is provided as a function of the time derivation of the monitored operating variable. An end of a control intervention may thus be advantageously reached, depending on the situation.

According to another specific embodiment, the drive motor may be short-circuited during activation of the regulating unit, so that, in particular, it may be advantageously braked.

The present invention is explained in greater detail below on the basis of preferred exemplary embodiments with reference to the figures.

DETAILED DESCRIPTION OF EXAMPLE EMBODIMENTS

Figure 1:
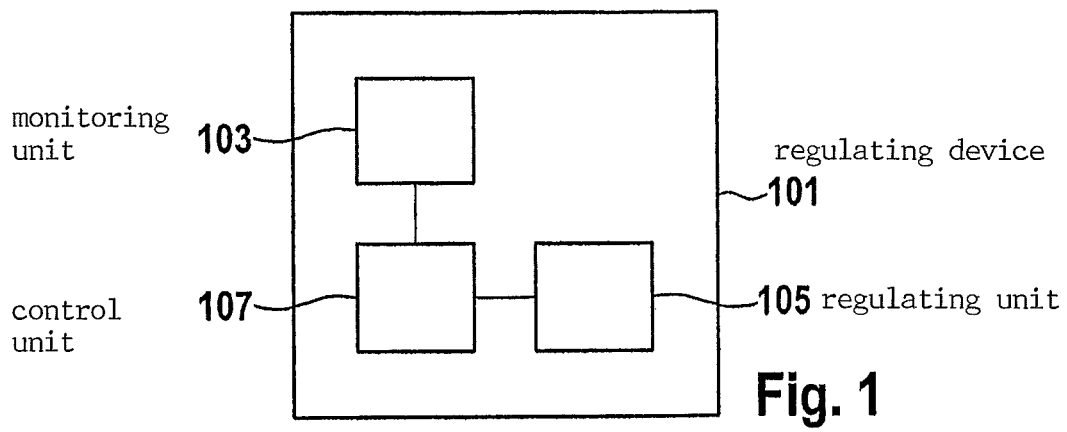
FIG. 1 shows a device for regulating an increase in the output torque over time of an electric drive motor.

The same reference numerals are used below for the same features.

FIG. 1 shows a device 101 for regulating an increase in the output torque over time of an electric drive motor (not illustrated). Device 101 includes a monitoring unit 103 for monitoring an operating variable of the drive motor. The operating variable may be, for example, an electric variable supplied to the drive motor. The operating variable may preferably be a motor speed. The electric variable may preferably be an electric current and/or a voltage. Device 101 furthermore includes a regulating unit 105 for regulating the operating variable for regulating the increase in output torque over time. In particular, this means that regulating unit 105 regulates the operating variable in such a way that the increase in output torque over time is regulated.

A control unit 107 is furthermore provided which may activate regulating unit 105 as a function of a time derivation of the monitored operating variable. Once regulating unit 105 has been activated, it regulates this operating variable in such a way that the increase in output torque over time is regulated, in particular reduced, stopped or reversed. In particular, regulating unit 105 reduces the operating variable. The regulation by the regulating unit may, in particular, also be generally referred to as a control intervention. In order for the full range of functions, in particular the maximum possible output torque to be available again after a predetermined period of time, the regulation of the operating variable is terminated automatically after a predetermined period of time. For this purpose, regulating unit 105 is designed to be deactivated after the predetermined period of time. Multiple operating variables may also be preferably monitored. In particular, multiple operating variables may also be regulated.

In one specific embodiment, which is not illustrated, control unit 107 includes an evaluating unit which may evaluate the monitored operating variable. In particular, this therefore means that the evaluating unit is designed to generate the time derivation, in particular the first time derivation, from the monitored operating variable.

In one specific embodiment, which is not illustrated, it may be provided that the regulating unit is automatically and independently deactivated after the predetermined period of time. In another specific embodiment, which is not illustrated, however, it may also be provided that the control unit deactivates the regulating unit after the predetermined period of time.

Figure 2:
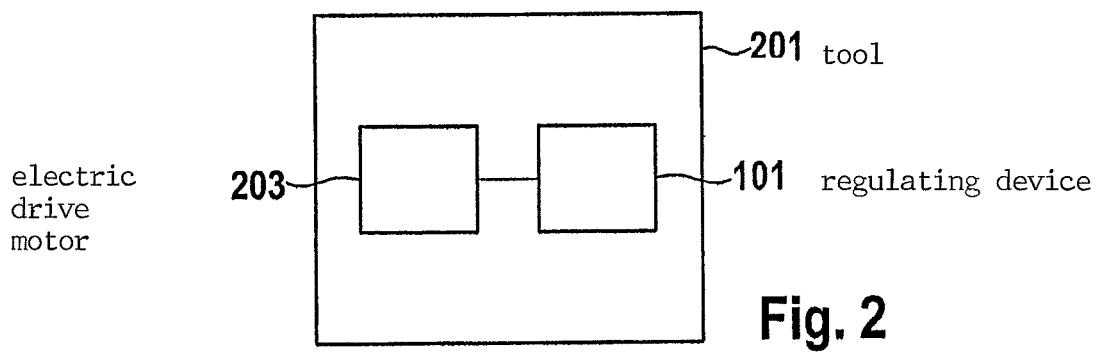
FIG. 2 shows a tool.

FIG. 2 shows a tool 201 having an electric drive motor 203. Tool 201 furthermore includes device 101.

Figure 3:
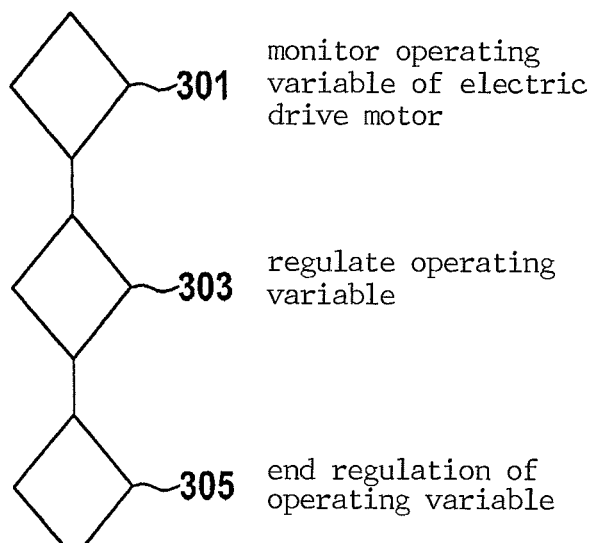
FIG. 3 shows a flow chart of a method for regulating an increase in the output torque over time of an electric drive motor.

FIG. 3 shows a flow chart of a method for regulating an increase in the output torque over time of an electric drive motor. An operating variable of the electric drive motor is monitored in a step 301. The operating variable is regulated in a step 303, this regulation being carried out as a function of a time derivation of the monitored operating variable. The regulation is carried out for the purpose of regulating the increase in output torque over time. The regulation of the operating variable is terminated after a predetermined period of time in a step 305. As a result, the full range of functions, in particular the maximum possible output torque of the electric drive motor, is advantageously available again.

Figure 4:
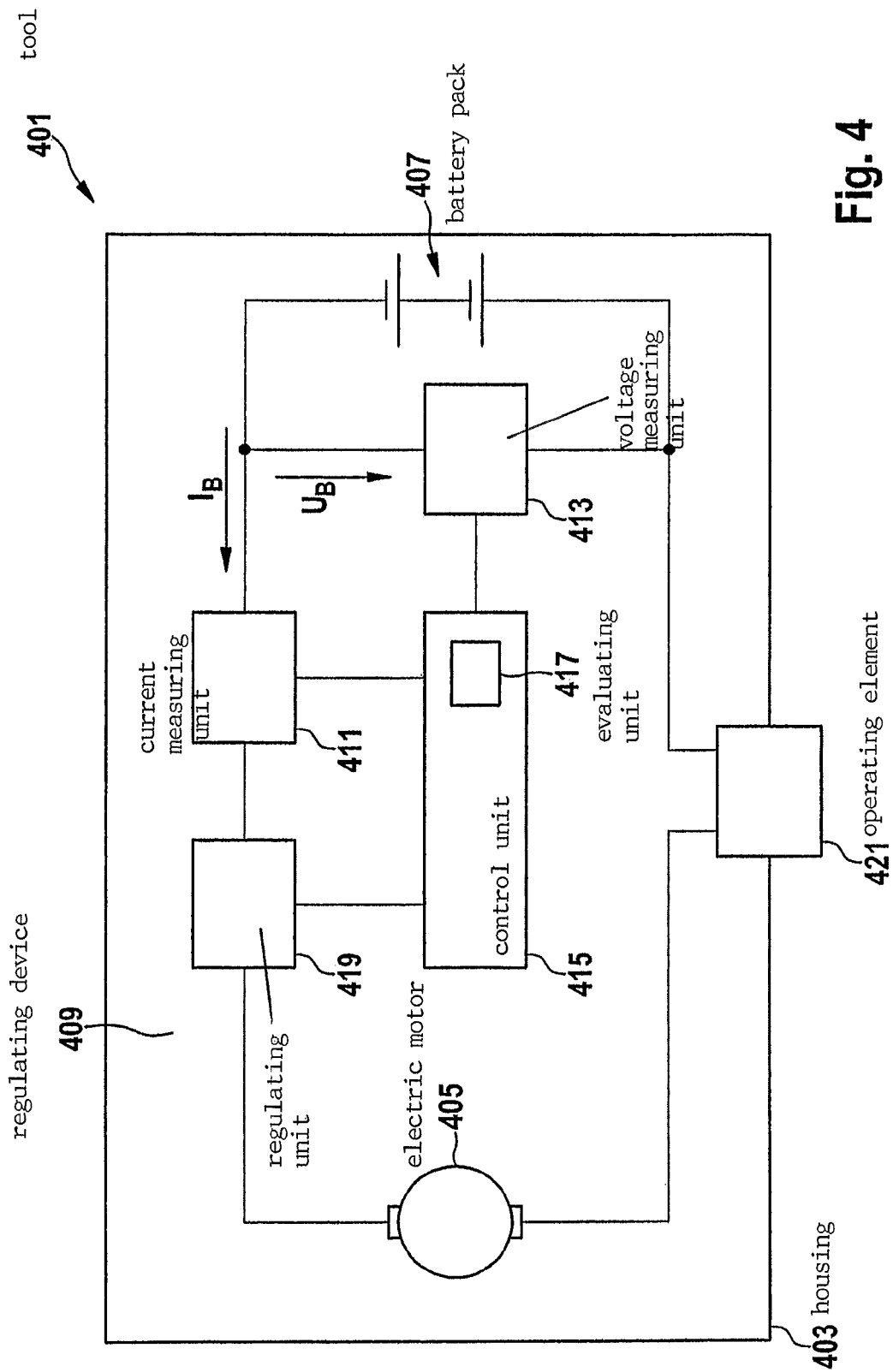
FIG. 4 shows another tool.

FIG. 4 shows another tool 401, which includes a housing 403. An electric motor 405, which may be supplied with electrical power with the aid of a battery pack 407, is situated in housing 403. Battery pack 407 provides electric motor 405 with an operating voltage $U_B$, so that an operating current $I_B$ may flow to electric motor 405.

Tool 401 furthermore includes a device 409 for regulating the increase in the output torque over time of electric motor 405. Device 409 includes a monitoring unit which has a current measuring unit 411 and a voltage measuring unit 413. Current measuring unit 411 measures, in particular, operating current $I_B$. Voltage measuring unit 413 measures, in particular, operating voltage $U_B$.

Device 409 furthermore includes a control unit 415, which includes an evaluating unit 417. Evaluating unit 417 evaluates measured operating current $I_B$ and measured operating voltage $U_B$ and generates, in particular, a time derivation of the two monitored electric variables. In particular, the first time derivation is generated. In particular, this therefore means that a rate of change over time in the operating voltage is measured. In particular, a rate of change over time in the operating current is thus measured.

As a function of the two measured rates of change, control unit 415 activates a regulating unit 419, which is designed to vary operating current $I_B$ and/or operating voltage $U_B$. In particular, regulating unit 419 may include, in a specific embodiment which is not illustrated, a pulse width modulator which carries out a pulse width modulation of operating voltage $U_B$ and/or operating current $I_B$. In another specific embodiment, which is not illustrated, regulating unit 419 may also include a reversing unit for reversing an electric field generated with the aid of electric motor 405.

Tool 401 furthermore has an operating element 421 which may activate and deactivate electric motor 405, for example by closing and opening a corresponding circuit which is generated, in particular, with the aid of electric motor 405 and battery pack 407.

Battery Pack 407 is furthermore detachably situated in housing 403. In one specific embodiment, which is not illustrated, it may be provided that battery pack 407 is fixedly attached within housing 403.

In particular, constants, for example a permissible current-limiting rate of change $\Delta I_{BG}$ and/or a voltage-limiting rate of change $\Delta U_{BG}$, may also be stored in evaluating unit 417. In particular, signal processing and signal generation are carried out in evaluating unit 417. The reciprocal value of the clock frequency of the control unit may be provided as a minimum possible time interval for determining the rates of change, in particular in the case of a digital control unit.

Operating current $I_B$ and operating voltage $U_B$ are measured continuously, i.e., on an ongoing basis, during regular operation of tool 401. Operating current rate of change $\Delta I_B$ and/or operating voltage rate of change $\Delta U_B$ is/are ascertained therefrom in evaluating unit 417. Regulating device 419 is activated with the aid of control unit 415 if a positive operating current rate of change $\Delta I_B$ exceeds predefined current-limiting rate of change $\Delta I_{BG}$ or violates the predefined range of current-limiting changes, and/or if the absolute value of a negative operating voltage rate of change $\Delta U_B$ exceeds predefined voltage-limiting rate of change $\Delta U_{BG}$ or violates the predefined range of voltage-limiting changes. A range of current-limiting changes or a range of voltage changes defines a range in which a corresponding rate of change is not permitted. If the measured rate of change lies within the range, a violation has occurred which results in an activation of regulating unit 419.

Regulating unit 419 reduces operating current $I_B$ and/or operating voltage $U_B$, in particular an effective current and/or an effective voltage, so that a physical work of electric motor 405 is advantageously reduced by a fixed amount, in particular at least 30% with regard to its maximum possible physical work, it being provided that regulating unit 419 is deactivated again after a predetermined period of time, for example 2 seconds. In particular, it may be provided that control unit 415 deactivates regulating unit 419. However, it may also be preferably provided that regulating unit 419 is automatically and independently deactivated after the predetermined period of time.

Regulating unit 419 may produce a PWM mode or a comparable discontinuous operating mode for varying the physical work, for example via a switch, which is not illustrated, and/or via a pulse width modulator, whereby the increase in output torque over time is reduced, stopped or reversed.

Figure 5:
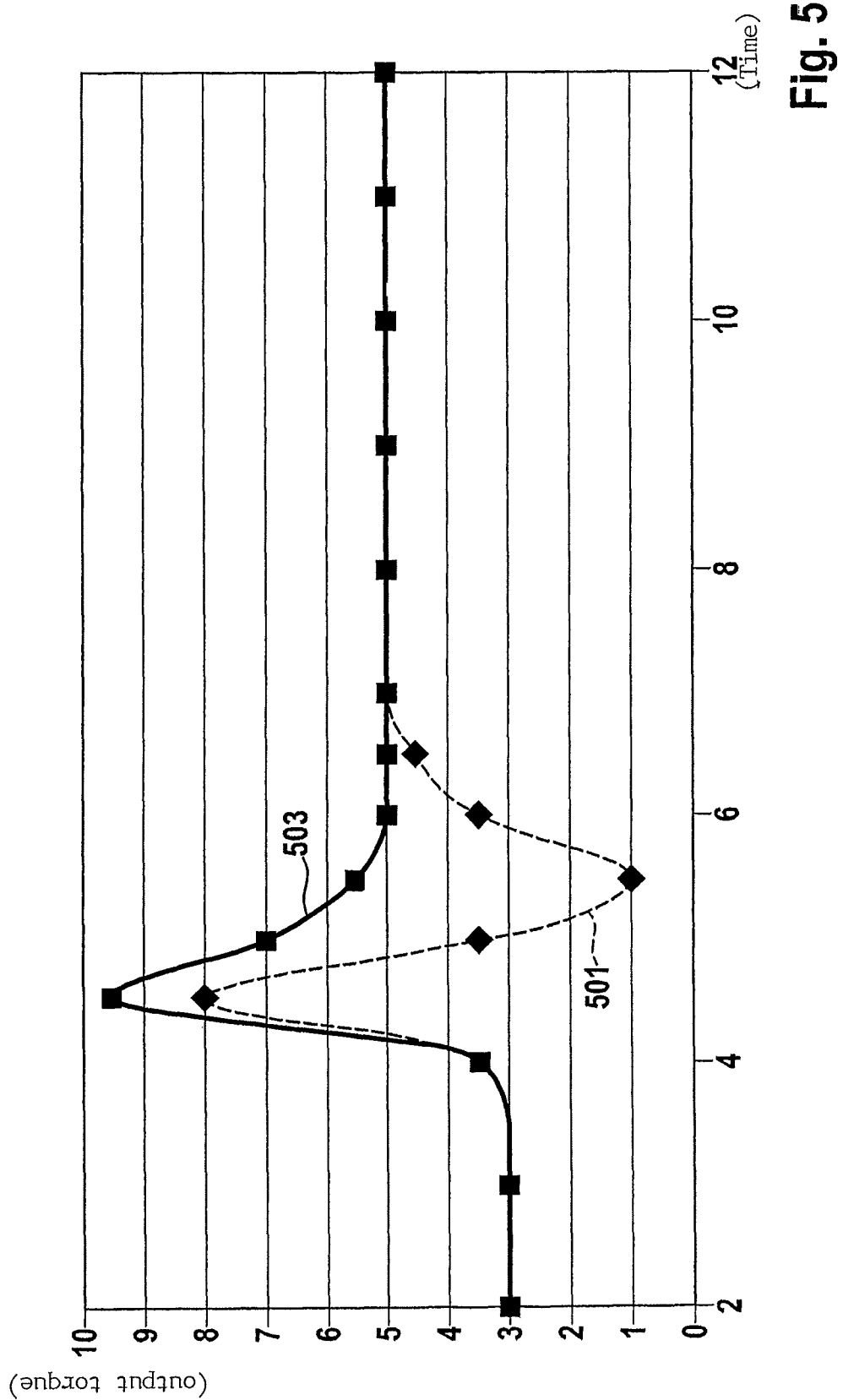
FIG. 5 shows two output torque curves over time.

FIG. 5 shows two output torque curves over time. An output torque is plotted on the ordinate in random units. The time is plotted on the abscissa, also in random units. The curve identified by reference numeral 501 shows an output torque curve of an electric motor in a tool having a device for regulating an increase in output torque over time. The curve identified by reference numeral 503 shows a time curve of an output torque of an electric motor in a conventional tool without the device. As the curves clearly show, an increase in output torque over time is mitigated according to the device and stopped on a lower level compared to the conventional tool, which advantageously avoids damage to mechanical and/or electrical components of the tool and, in particular, enables the user to grip the tool more securely.

The present invention includes activating a regulating device with the aid of a control unit when a rate of current increase exceeds a defined current-limiting rate of change, and/or when the absolute value of the voltage drop rate exceeds the absolute value of a defined voltage-limiting rate of change, and/or the absolute value of a motor speed rate of change exceeds the absolute value of a predefined motor speed-limiting rate of change, the regulating device regulating the effective current and/or the effective voltage, in particular the operating current and/or the operating voltage and/or the motor speed, so that the increase in output torque over time is stopped, reversed or reduced thereby. This advantageously causes the physical work to be reduced; in particular it may be reduced by at least 30%. Furthermore, the present invention includes, in particular, the idea of resetting this control intervention to 0 with the aid of the regulating unit within a predetermined period of time, which may also be generally referred to as a regulating period. In particular, this therefore means that the regulating unit is deactivated after the predetermined period of time or after the regulating period.

In particular, the present invention includes the idea that the control unit activates the regulating device, in particular, only when the current increase rate is within the range between the defined minimum current-limiting rate of change and the defined maximum current-limiting rate of change, and/or when the absolute value of the voltage drop rate is within the range between the defined minimum voltage-limiting rate of change and the defined maximum voltage-limiting rate of change.

In particular, the present invention permits a mechanical robustness in tools, despite miniaturized or economical components.

In addition, this approach advantageously prevents an operator or user from experiencing surprising changes in holding torque.

Furthermore, a protection of sensitive workpieces or tools is advantageously provided.

Unwanted control intervention during normal operation is advantageously avoided, in particular by detecting a number of time increments in which the limiting increase in the operating current and/or the limiting drop in the operating voltage is exceeded or in which the limiting increase range of the operating current and/or the limiting decrease range of the operating voltage is violated. Just a few time increments of the exceeding or violation indicate, in particular, "normal operation;" multiple time increments of the exceeding or violation indicate, in particular, a mounting overload situation. Only then is the regulating unit preferably activated.

When using an EC motor, in particular, the control intervention may advantageously also be carried out in such a way that the electric field of the EC motor is briefly reversed, which advantageously enables the maximum torque value to be reduced, and/or at least the torque reduction may take place more rapidly.

What is claimed is:

1. A device for regulating an increase in output torque over time of an electric drive motor, comprising:
   a monitoring unit to monitor an operating variable of the electric drive motor;
   a regulating unit to regulate the operating variable for regulating the increase in output torque over time; and
   a control unit to activate the regulating unit as a function of a time derivation of the operating variable to regulate the operating variable;
   wherein the regulating unit is automatically deactivated after a predetermined, fixed period of time following the activation of the regulating unit to regulate the operating variable.

2. The device as recited in claim 1, wherein the regulating unit includes a pulse width modulator for a pulse width modulation of the operating variable.

3. The device as recited in claim 1, wherein the regulating unit includes a reversing unit for reversing an electric field generated with the aid of the drive motor.

4. A method for regulating an increase in output torque over time of an electric drive motor, comprising:

monitoring an operating variable of the electric drive motor; and activating a regulating unit as a function of a time derivation of the operating variable to regulate the operating variable for regulating the increase in output torque over time;

wherein the regulation of the operating variable by the regulating unit is automatically terminated after a predetermined, fixed period of time following the activation of the regulating unit to regulate the operating variable.

5. The method as recited in claim 4, wherein the regulation of the operating variable includes a pulse width modulation of the operating variable.

6. The method as recited in claim 4, wherein an electric field generated with the aid of the electric drive motor is reversed to regulate the increase in output torque over time.

7. The method as recited in claim 4, wherein the operating variable is regulated when an absolute value of the time derivation is greater than an absolute value of a predefined limiting value multiple times consecutively within a predefined period of time.

8. The method as recited in claim 4, wherein the regulation includes reducing the operating variable, the reduced operating variable being increased back to its value prior to the reduction over the predetermined period of time.

9. A tool, comprising:
an electric drive motor; and
a device for regulating an increase in output torque over time of an electric drive motor, the device including a monitoring unit to monitor an operating variable of the electric drive motor, a regulating unit to regulate the operating variable for regulating the increase in output torque over time, and a control unit to activate the regulating unit as a function of a time derivation of the operating variable to regulate the operating variable, wherein the regulating unit is automatically deactivated after a predetermined, fixed period of time following the activation of the regulating unit to regulate the operating variable.

10. A non-transitory computer-readable data storage medium storing a computer program having program codes which, when executed by a computer, performs a method for regulating an increase in torque output over time of an electric motor device, the method comprising:

monitoring an operating variable of the electric drive motor; and activating a regulating unit as a function of a time derivation of the operating variable to regulate the operating variable for regulating the increase in output torque over time;

wherein the regulation of the operating variable by the regulating unit is automatically terminated after a predetermined, fixed period of time following the activation of the regulating unit to regulate the operating variable.

* * * * *